United States Patent
Solin

(10) Patent No.: US 7,512,635 B1
(45) Date of Patent: Mar. 31, 2009

(54) SYSTEM AND METHOD FOR UPDATING INFORMATION ON A COMPUTER SYSTEM USING A LIMITED AMOUNT OF SPACE

(75) Inventor: David A. Solin, Keene, NH (US)

(73) Assignee: BMC Software, Inc., Houston, TX (US)

( * ) Notice: Subject to any disclaimer, the term of this patent is extended or adjusted under 35 U.S.C. 154(b) by 165 days.

(21) Appl. No.: 09/855,042

(22) Filed: May 14, 2001

Related U.S. Application Data

(60) Provisional application No. 60/256,680, filed on Dec. 18, 2000.

(51) Int. Cl.
*G06F 12/00* (2006.01)
(52) U.S. Cl. .................................. 707/200; 717/168
(58) Field of Classification Search ......... 707/200–206; 717/168–173
See application file for complete search history.

(56) References Cited

U.S. PATENT DOCUMENTS

| | | | | |
|---|---|---|---|---|
| 5,129,093 A * | 7/1992 | Muramatsu et al. | ........... | 712/28 |
| 5,386,553 A * | 1/1995 | Fujita | ........... | 707/205 |
| 5,551,027 A * | 8/1996 | Choy et al. | ........... | 707/201 |
| 5,724,552 A * | 3/1998 | Taoda | ........... | 711/165 |
| 5,732,265 A * | 3/1998 | Dewitt et al. | ........... | 707/200 |
| 5,734,898 A * | 3/1998 | He | ........... | 707/203 |
| 5,765,168 A * | 6/1998 | Burrows | ........... | 707/200 |
| 5,778,393 A * | 7/1998 | Blea et al. | ........... | 707/205 |
| 5,832,509 A * | 11/1998 | Mortis et al. | ........... | 707/200 |
| 5,873,097 A * | 2/1999 | Harris et al. | ........... | 707/203 |
| 5,919,247 A * | 7/1999 | Van Hoff et al. | ........... | 709/217 |
| 5,950,198 A * | 9/1999 | Falls et al. | ........... | 707/8 |
| 6,012,063 A * | 1/2000 | Bodnar | ........... | 707/101 |
| 6,021,415 A * | 2/2000 | Cannon et al. | ........... | 707/206 |
| 6,092,079 A * | 7/2000 | Gerard et al. | ........... | 707/103 R |
| 6,286,138 B1 * | 9/2001 | Purcell | ........... | 717/143 |
| 6,311,186 B1 * | 10/2001 | MeLampy et al. | ........... | 707/10 |
| 6,314,418 B1 * | 11/2001 | Namba | ........... | 707/2 |
| 6,397,307 B2 * | 5/2002 | Ohran | ........... | 711/161 |
| 6,446,092 B1 * | 9/2002 | Sutter | ........... | 707/203 |
| 6,470,496 B1 * | 10/2002 | Kato et al. | ........... | 717/173 |
| 6,519,614 B1 * | 2/2003 | Kanai et al. | ........... | 707/202 |
| 6,535,911 B1 * | 3/2003 | Miller et al. | ........... | 709/217 |
| 6,549,919 B2 * | 4/2003 | Lambert et al. | ........... | 707/203 |
| 6,609,183 B2 * | 8/2003 | Ohran | ........... | 711/161 |
| 6,611,835 B1 * | 8/2003 | Huang et al. | ........... | 707/10 |
| 6,650,620 B1 * | 11/2003 | Neogi | ........... | 370/231 |
| 6,651,249 B2 * | 11/2003 | Waldin et al. | ........... | 717/170 |
| 6,654,746 B1 * | 11/2003 | Wong et al. | ........... | 707/10 |
| 6,654,769 B2 * | 11/2003 | Ito et al. | ........... | 707/200 |
| 6,738,799 B2 * | 5/2004 | Dickenson | ........... | 709/203 |
| 2003/0177485 A1 * | 9/2003 | Waldin et al. | ........... | 717/169 |

OTHER PUBLICATIONS

Segal et al., Dynamic Program Updating in a Distributed Computer System, Software Maintenance, 1988., Proceedings of the Conference on, Oct. 24-27, 1988 pp. 198-203.*

* cited by examiner

*Primary Examiner*—Greta L Robinson
(74) *Attorney, Agent, or Firm*—Wong, Cabello, Lutsch, Rutherford & Brucculeri, LLP

(57) ABSTRACT

A method and system updates files or other information on a computer system. Updates received are installed, and then additional updates are requested in a specified order.

10 Claims, 4 Drawing Sheets

SYSTEM AND METHOD FOR UPDATING INFORMATION ON A COMPUTER SYSTEM USING A LIMITED AMOUNT OF SPACE

RELATED APPLICATION

This application claims the benefit of U.S. Provisional Application No. 60/256,680 entitled, "METHOD AND APPARATUS FOR UPDATING INFORMATION ON A COMPUTER SYSTEM USING A LIMITED AMOUNT OF SPACE" filed on Dec. 18, 2000 by David Solin and is hereby incorporated herein by reference in its entirety.

FIELD OF THE INVENTION

The present invention is related to computer software and more specifically to computer software for automatic updating of information on a computer system.

BACKGROUND OF THE INVENTION

Conventional techniques to update software allow a remote client computer system or a server system to identify files or other information in need of updating. Information useful for updating is then downloaded from the server system to the remote client computer system, where the update information is verified to ensure it was properly received. If the update information has been properly received, the update information received is used to update the client computer system.

However, if the update contains a large amount of information, there may not be sufficient storage capacity on the client computer system to store all of the information. What is needed is a system and method that can update a computer system without exceeding a specific storage capacity of the computer system.

SUMMARY OF INVENTION

A system and method logically divides the file system of a client computer system into discrete portions called channels. Updates to each channel and an index describing the files that make up the update, received previously, are stored in a holding area. Upon a triggering event, such as each time the user turns the client computer system on, the client computer system selects a channel having an update in the holding area, retrieves the index for that channel, and uses the index to verify the update for that channel. If all of the files for the update to a channel as specified by the channel index are properly stored in the holding area, the system and method installs the update for that channel, copies the index, deletes the update from the holding area and selects another channel using an order specified by a manifest containing an ordered list of the channels to which the computer system may receive updates. Once all such updates are installed and deleted from the holding area, the client computer system requests a new manifest from a server, and then requests and stores into the holding area updates to the channels in the order in which channels are listed on the manifest until no further updates will fit into the holding area or all available updates have been received. The updates are then installed at the next event as described above.

DETAILED DESCRIPTION OF A PREFERRED EMBODIMENT

Figure 1:
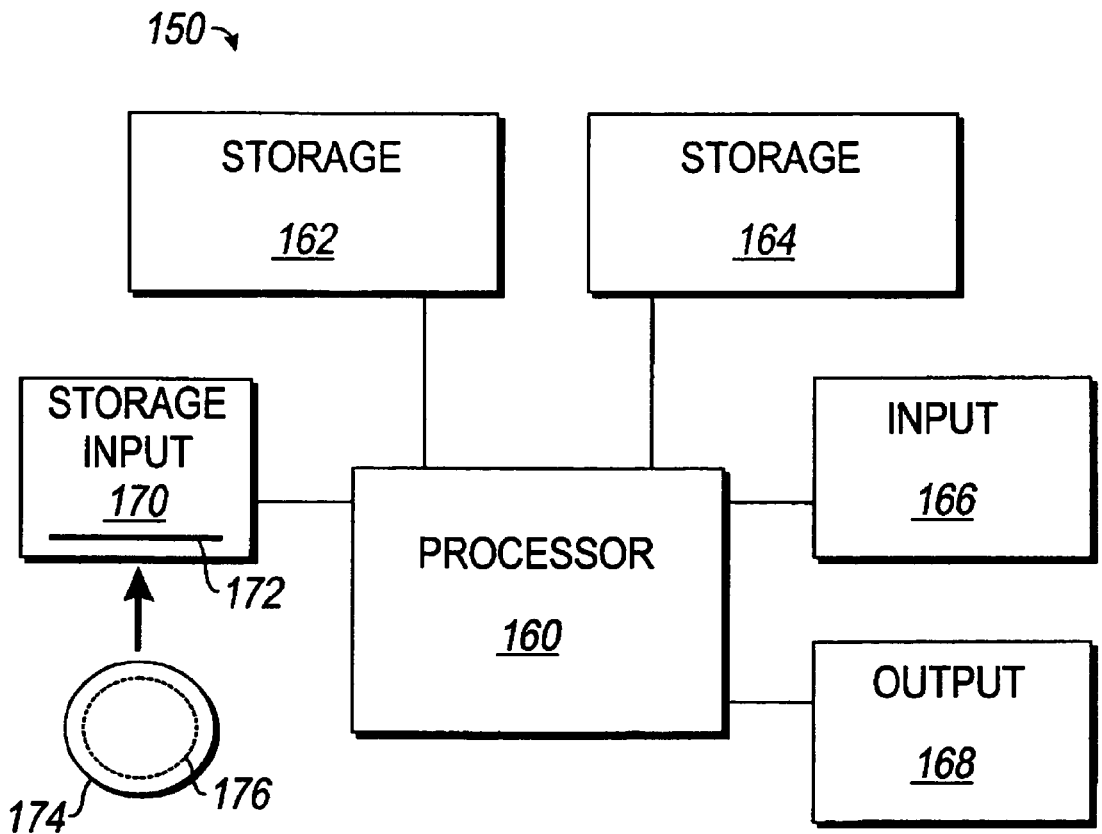
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running the Windows (95, 98, ME, NT or 2000) operating system commercially available from Microsoft Corporation of Redmond Wash. or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 2:
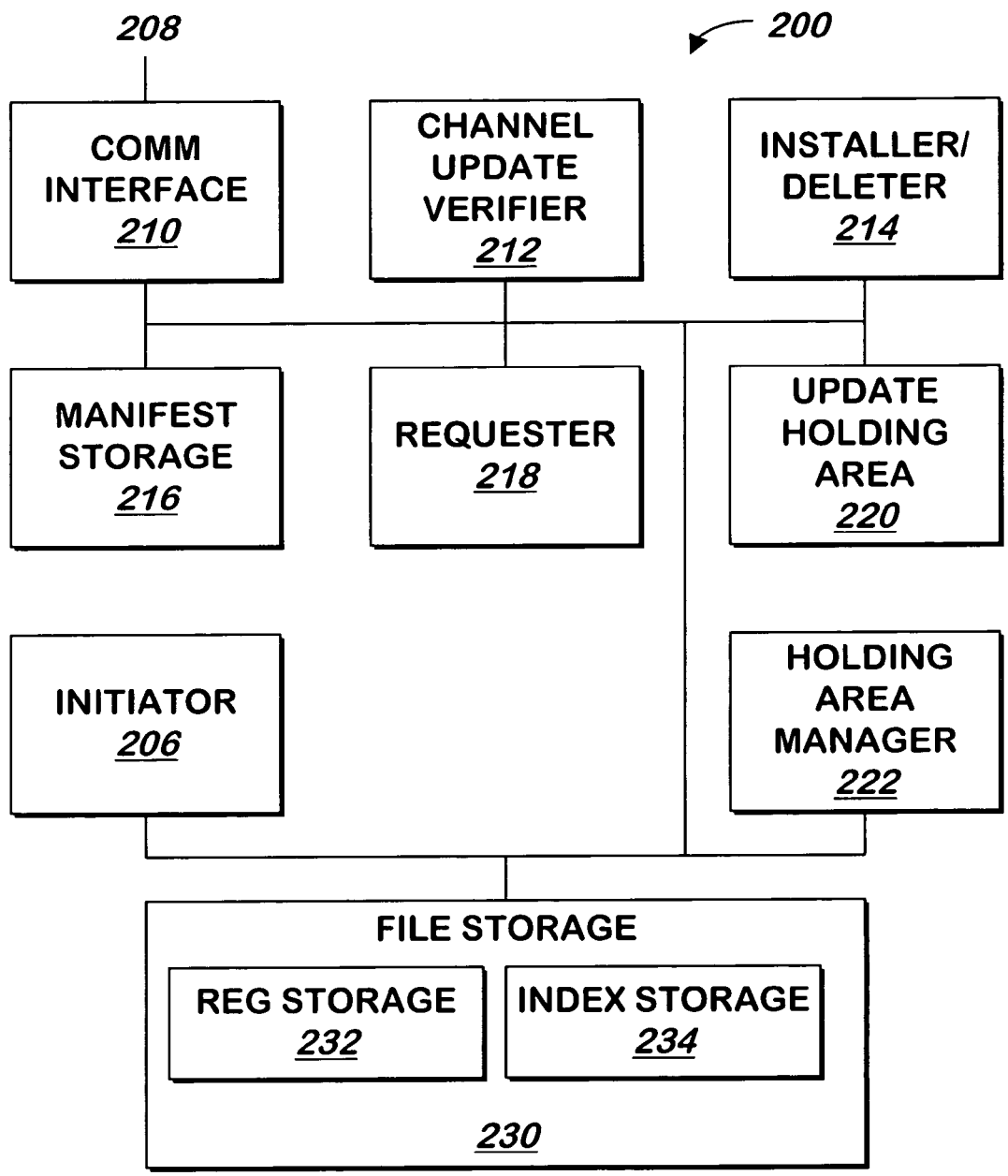
FIG. 2 is a block schematic diagram of a system for updating files or other information on a computer system according to one embodiment of the present invention.

Referring now to FIG. 2, a system 200 for updating a computer system is shown according to one embodiment of the present invention. The present invention is described below for updating files on the computer system, but any form of information such as records in a database, firmware in the BIOS or any other form of information may be updated by the present invention.

In one embodiment, operation of system 200 is initiated by the occurrence of an event, such as when the user turns on or restarts the computer system onto which system 200 is installed. Initiator 206 detects this event and runs installer/deleter 214, described below. In one embodiment, initiator 206 is a portion of an operating system (not shown) such as the conventional Windows NT/2000 operating system commercially available from Microsoft Corporation of Redmond, Wash. In one embodiment, the executable program comprising installer/deleter 214 is configured to run as a "windows service", and initiator 206 runs all such services after the operating system boots.

In one embodiment, when initiator 206 runs the executable file comprising installer/deleter 214, installer/deleter 214 requests holding area manager 222 to identify whether any channel updates are stored in the holding area 220. The holding area 220 may be conventional file or disk storage and is used to store updates to channels, including files used to update a channel as well as channel indices describing the channel and the channel update as described in more detail below.

Holding area manager 222 scans the holding area 220 for channel indices stored there and responds to the request by providing an identifier of the channel, if any, having the earliest order in the manifest stored in manifest storage 216, described below, for which an update is stored in update holding area.

The manifest contains an ordered list of channel identifiers corresponding to each channel for which a user may request and receive updates, and a URL for each channel or for all channels from which one or more channel updates may be retrieved. The manifest may also contain the URL of a server from which an updated manifest may be retrieved. The manifest may also contain an identifier of the user or computer system or the type of user or computer system to allow a determination of which channels a user can subscribe (e.g. sales managers can subscribe to one channel, salespeople can subscribe to another). Manifest storage 216 is any conventional storage area for storing the manifest, including conventional disk storage or conventional memory, although other forms of storage may be used.

A channel may correspond to a portion of the file storage 230 used by the computer system being updated by system 200. For example, a channel may include a subdirectory and some or all descendant directories of that subdirectory in the hierarchical or other file system of a computer system being managed by system 200, though a channel may include files or directories outside of that portion of the file system, such as a file in an ancestor directory of a hierarchical file system.

If no updates remain in the holding area, holding area manager 222 will respond with an indication that no further updates remain to be installed. In such event, installer/deleter 214 signals requester 218 to begin requesting channel updates as described below. Otherwise, installer/deleter 214 signals channel update verifier 212 by passing it the identifier of the channel received from holding area manager 222.

After receiving the channel identifier, channel update verifier 212 passes it to holding area manager 222 to request a channel index for the channel corresponding to the identifier it receives from update holding area 220, and verifier 212 receives the channel index from holding area manager 222.

Update holding area 220 stores channel updates, which are conventional computer files. The channel update includes update files for the channel as well as a channel index, which includes an identifier of the channel, and the file names and other information that may be used to verify that the files in the update were properly received. In one embodiment, in general, a channel index includes a description of a superset of the files and subdirectories in the channel immediately before and immediately after a particular point in time. All files and directory names are listed in the channel index in a hierarchical fashion, whereby the hierarchy in the channel index is a superset of the hierarchy of the channel in file storage 230, both immediately before and immediately after, the point in time. In the case of the channel index in the update holding area 220, the point in time is upon the installation of the update corresponding to the index. The index may also include instructions for updating the files in the channel, such as instructions to delete an existing file, replace an existing file with an update, add a new file to the channel or modify an existing file according to instructions received in an update file. Details about the channel index are described in U.S. Pat. No. 5,919,247, entitled "Method for Code and Data Updates" having the same assignee as the present invention and that patent is hereby incorporated by reference in its entirety.

In one embodiment, channel update verifier 212 selects one update file listed in the channel index as a file to be added or modified and passes the file name to holding area manager 222, which queries the operating system for the actual size of the file stored in update holding area 220 and returns the size of the file to channel update verifier 212. Channel update verifier 212 compares the file size in the channel index with the size received from holding area manager 222 to ensure that the file was fully received. In one embodiment, a hash of the file is received as part of the channel index and channel update verifier 212 rehashes the file and compares the hash result it produces with the hash result for the file in the channel index. In one embodiment, the conventional MD-5 hash is used for this purpose, although any conventional hash function may be used, such as SNERFU, N-Hash, MD2, MD4, any of the SHA algorithms, RIPE-MD, HAVAL or any other hash algorithm as long as the hash function used by channel update verifier 212 is the same as the hash function used to produce the hash result in the channel index.

Channel update verifier 212 also computes the hash of the entire subdirectory using the technique described in U.S. Pat. No. 5,919,247, entitled "Method for Code and Data Updates" having the same assignee as the present invention. The hash of the subdirectory may be computed by multiplying each hash of a file (and/or the filename) in the subdirectory (and optionally, the hash of the subdirectory name) by a different prime number and summing the results for all the files (and the name of the subdirectory) in that subdirectory. This hash result is also stored in the channel index and used by channel update verifier 212 to compare with the result it calculates.

If the download was incomplete (i.e. if the operating system returns an error rather than a size) or a different size than is listed for the file in the channel index or if the hash results do not match, channel update verifier 212 signals installer/deleter 214 that the channel download has an error. Installer/deleter 214 instructs holding area manager 222 to delete the channel update from the holding area, and requests holding area manager 222 the next channel identifier for which a channel index is stored in the update holding area 220 in the order of the manifest in manifest storage 216, and the process of verifying the files in the channel update is repeated for that channel as described above.

If the file is properly received, channel update verifier 212 selects another update file from the channel index and repeats the verification process until all files and subdirectories in the channel index have been selected and verified.

In an alternate embodiment of the present invention, instead of or in addition to installer/deleter 214 initiating the update verification process immediately before the update is installed as described above, holding area manager 222 requests channel update verifier 212 performs the update verification process as the files in a channel update are received as described below. This allows channel updates that contain an error to be discarded and rerequested without occupying space in the update holding area. However, the update verification process may need to be performed again just before the update is installed to ensure that the update has not become corrupted or partially or fully deleted between the receipt of the channel update and the installation of the channel update.

In one embodiment, after verifying all the files in a channel update have been properly received, channel update verifier 212 signals installer/deleter 214.

In one embodiment, when all files in a channel have been verified as described above, installer/deleter 214 requests the operating system (not shown) to prompt the user that updates are required. If the user signals that he does not wish to install the updates, installer/deleter 214 terminates the operation of system 200 either until the next initiation or until an operating system timer set by installer/deleter 214 signals installer/deleter 214, which then repeats the process of prompting the user.

In one embodiment, if and when the user signals that the installation should occur, installer/deleter 214 installs the channel. To perform the installation, installer/deleter 214 passes the channel identifier to holding area manager 222 and requests the channel index for that channel, which holding area manager retrieves from the holding area 220 and provides to installer/deleter 214. Installer/deleter 214 uses instructions in the index and the files for the channel in the update holding area 220 to replace, delete or modify existing files or add new files at specified nodes in file storage 230 that correspond to the channel index for the selected channel and/or to adjust registry files, autoexec.bat files in registry storage 232 or other files, which may be a part of or different from the channel, in file storage 230. File storage 230 may be a part of the conventional file storage such as disk or memory storage of the system 200.

To replace, delete or modify existing files, or add new files, installer/deleter 214 provides the appropriate command to operating system (not shown) to delete the existing file and/or copy the file from the update holding area 220 to the portion of file storage 230 specified by the index. If the file is noted on the channel index as containing instructions for modification of the channel file as described in are described in U.S. Pat. No. 5,919,247, entitled "Method for Code and Data Updates", installer/deleter 214 reads the file in the holding area 220 and the file in the channel in file storage 230, makes the modifications and stores the file back into file storage 230 using operating system (not shown).

In one embodiment, the location of the file in update holding area 220 is inferred using a fixed root directory of the update holding area and a subdirectory corresponding to the index identifier (e.g. all files for the index are stored in a non-hierarchically arranged subdirectory of a "Holding Area" root directory having a name corresponding to the channel index) or corresponding to the identifier of the index and the index itself (e.g. all files for the index are stored in a subdirectory of a "Holding Area" root directory having a name corresponding to the channel index, and further arranged in the subdirectories similar to those of the channel index). Holding area manager 222 uses these locations in update holding area 220 when it stores the files it receives. The destination location is specified in the channel index, either by explicitly specifying the location of each file, or specifying the location from a root directory that is also specified in the channel index.

When all files have been updated according to the index, installer/deleter 214 copies the index of the installed channel to index storage 234 which may be part of the file storage 230 and may include conventional disk storage or memory. After the files have been installed and/or adjusted, installer/deleter 214 signals holding area manager 222 to delete all files for that channel update from update holding area 220.

Installer/deleter 214 then requests another channel identifier from holding area manager as described above and repeats the process of validation and installation described above until all correctly-received channel updates have been installed. Installer/deleter 214 need not rerequest the user for permission to install the files after the user has affirmatively responded to the first request. In another embodiment, the channels are all verified in one batch by channel update verifier 212 and those that are not deleted because of a failure of verification are then installed in another batch, one channel at a time, in the order that such channels are arranged in the manifest. When no more channel indices remain in the update holding area 220, holding area manager 222 deletes any remaining files from holding area 220 and notifies installer/deleter 214.

In one embodiment, installer/deleter 214 may signal requester 218 when it has completed updating the computer system as described above. Installer/deleter 214 may signal the user to restart the computer system if any installation required adjustment of a registry file. In this case, installer/deleter 214 restarts the user's computer system, which will cause the entire process described above to be repeated. Because no updates will be in update holding area 220 upon initiation, however, installer/deleter 214 signals requester 218 as described above.

In one embodiment, when signaled following installation of all channel updates stored in update holding area 220 as described above, requester 218 requests a new manifest by sending some or all of the existing manifest from manifest storage 216, which may contain an identifier of the computer system onto which system 200 is installed or an identifier of the user using such computer system, to a manifest server coupled via communications interface 210 and input/output 208 which may be coupled to the Internet or another conventional network. The identifier of the user may be an identifier of the type or user, and need not specifically identify the exact user. For example, the user identifier could merely identify the user as a manager in the sales department.

Communications interface 210 is any conventional communications interface such as a conventional TCP/IP compatible communications interface, LAN interface or WAN interface, although other forms of communication may be used. Requester 218 may signal the operating system to prompt the user for permission to connect to the manifest server via communications interface 210 before it connects as described above or requester may wait until a connection to the Internet or other network is available. If the user signals that permission is denied, requester 218 terminates the operation either until the next initiation or until an operating system timer set by requester 218 signals re-prompting of the user.

As described above, the manifest contains a location of a server that may be used to request an updated manifest, and requester 218 passes the location of the manifest server to communications interface 210, which establishes a connection to that server. Requester 218 also passes to communications interface 210 to be sent to the manifest server through input/output 208 some or all of the manifest itself or another internally stored identifier or an identifier requested from the user that may be used to identify the new manifest that a user should receive.

In one embodiment, the manifest server uses some or all of the manifest it receives to identify a new manifest to send to the user. For example, the manifest server may identify the user or type of user from the identifier in the manifest and identify a new manifest for that type of user (e.g. "all sales managers should have manifest number 4"). The new manifest contains the latest list of channels and server locations to which that user should subscribe, ordered as described above. The manifest server sends the new manifest it identifies to system 200 via communications interface 210.

In one embodiment, communications interface 210 receives a new manifest from the manifest server through input/output 208 and passes it to requester 218. Requester 218 replaces the existing manifest in manifest storage 216 with the new manifest.

As described above, in one embodiment, the new manifest contains a list of channels to which the user should request updates and, for each channel or for a group of several channels, the manifest contains a location of a server (e.g. a URL) from which a channel update can be requested. Requester 218 sets an internal counter to '0' and selects the corresponding ordered channel from the manifest. Requester 218 uses the corresponding server location corresponding to the selected channel in the manifest to connect to the server through communications interface 210.

In one embodiment, a channel index for each channel is stored in index storage 234 of the file storage 230 for the system 200. Each channel has its own unique identifier, and that identifier is listed in the manifest and also part of the channel index. Requester 218 uses the channel identifier in the manifest in manifest storage 216 to locate the channel index for the channel in channel index storage 234. To request a channel update, requester 218 provides the channel index to the server for that channel. The server compares the channel index provided by requester 218 with a channel index it determines should be used by the user. There may be one channel index for all users or the channel index provided by requester 218 may contain information such as a user identifier or user type identifier (e.g. sales manager) that identifies the proper channel index for the server to compare against the channel index it receives from requester 218 and to provide a new index.

In one embodiment, the comparison process, generation process, and format of the channel index used by the server is described in U.S. Pat. No. 5,919,247, entitled "Method for Code and Data Updates" having the same assignee as the present invention and that patent is hereby incorporated by reference in its entirety. Briefly, the channel index contains a set of folder names and file names arranged in the same hierarchy as the files and folders in the channel on the users computer system. The server compares the channel index received, to the channel index it selects for the user, identifies which files on the user's system should be added, replaced, deleted, or modified using instructions found in a file. The server builds a new channel index that describes a superset of the files that currently exist on the user's system and those that will exist after the update by listing the filenames and folder names in a hierarchical arrangement that matches their arrangement on the file system of the computer system on which they are being stored, along with an identifier of the action that should be performed on the file and the size and/or hash of any file to be received.

In one embodiment, the channel index is received first from the server as part of the update response and passed to requester 218 by communications interface 210. In such embodiment, the channel index contains the overall size of the channel update or the sizes of each file that will be received as part of the rest of the update plus the size of the index received may be used to compute the overall update size, and requester 218 provides the size to holding area manager 222, which identifies whether sufficient space is available in update holding area 220 to store the new index and the remainder of the update for that channel. If so, holding area manager 222 signals requester 218 to continue the request, and requester 218 instructs the server to send any files to be added, replaced, or used to modify a file that were listed in the channel index, and the server sends such files, via communications interface 210.

Holding area manager 222 receives the files from the server through communications interface 210 and stores them in update holding area 220 as described above. In addition, holding area manager 222 also uses the size of the update and the channel index to compute the amount of storage available in update holding area 220 to be used to identify whether sufficient space exists for the next channel update.

In one embodiment, instead of receiving the update reply in two steps, and checking for sufficient space after receipt of the index, the update reply is received by requester 218 as a stream of data, and passed to holding area manager 222. Holding area manager 222 stores the data from the stream in update holding area 220 as it is received and maintains the amount of space left in update holding area 220. If the amount of space remaining in update holding area reaches zero or a threshold near zero, holding area manager 222 discards the remainder of the stream as well as the incomplete update for the channel and signals requester 218 to stop requesting updates.

If additional space is available in update holding area, holding area manager 222 signals requester 218. Requester 218 increments the internal counter after each channel update is downloaded and repeats the above requesting and downloading process for that channel. This process will continue for each channel on the manifest until either no channel in the manifest corresponds to the counter (because all available updates have been received) or update holding area 220 lacks space for a channel update to be downloaded.

In one embodiment, requester 218 operates as a low priority process with respect to other processes that use communications interface 210 so that requester 218 does not interfere with such other processes.

The updates will remain in the holding area until the installation process described above occurs, such as when the user turns on the computer system again.

Figure 3:
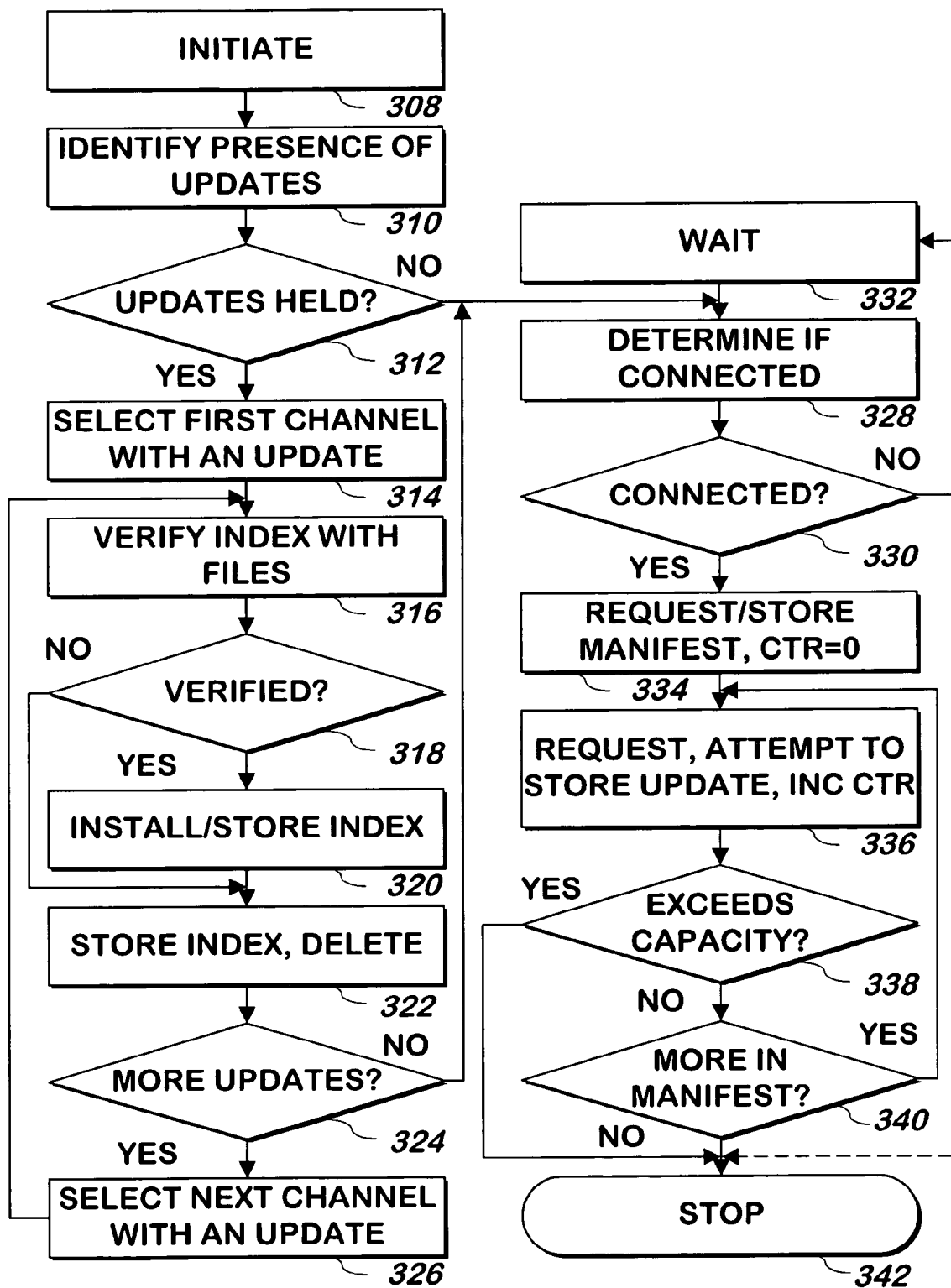
FIG. 3 is a flowchart illustrating a method of updating files or other information in a computer system according to one embodiment of the present invention.

Referring now to FIG. 3, a method for updating files is shown according to one embodiment of the present invention. In one embodiment, the method is initiated 308 by a user turning on or restarting a computer system. The presence in a holding area of any channel updates described above is determined 310, for example, by identifying the presence of any channel indices in the holding area. If no updates are present in the holding area, 312, the method continues at step 328.

If there are updates in the holding area 312, the first channel in the order of the manifest that has an update is selected 314. Each update for the channel is verified 316, which includes, for every file listed in the channel index as a file being added, replaced or modified, generating a checksum or hash of each update file received and comparing it with the checksum or hash for the file in the channel index, comparing the size of the file received with a size indicated on the channel index, or both.

If all stored updates for the channel selected in step 314 are verified, for example as having the proper checksum or hash and/or size 318, the update files are installed 320 at storage corresponding to the selected channel or an ancestor directory of the selected channel or a different storage area and/or used to adjust registry files and the method continues at step 322, otherwise the method continues at step 322. The index received is stored as described above, and the channel update in the holding area is then deleted 322.

If more updates remain in the holding area to be installed and/or deleted 324, the next update in the order of the updates listed in the manifest and that channel is selected 326, and the method continues at step 316. If not 324, the method continues at step 328.

In step 328, it is determined whether or not a connection is available to a communications network such as the Internet or a LAN. In one embodiment, if no such connection is available 330, the method may wait at step 332 while a connection is requested and may be made; then step 328 is repeated. In another embodiment indicated by the dashed line in the Figure, if no such connection is available, the method terminates 342, and steps 330 through 340 may be performed following a subsequent initiation of the method at step 308 which will cause the "no" branch of step 312 to be taken.

In one embodiment, if it is determined in step 328 that a connection is available 330, a new manifest is requested from a server and then stored in place of the previous manifest 334 and a counter is set 334 to '0'.

In one embodiment, a channel update for the channel on the new manifest that corresponds to the counter is requested from the corresponding server on the channel list as described above, and an attempt to store the channel update is made 336. If the storage space for channel updates is exceeded 338, the process terminates at step 342. Otherwise 338, if more channels remain on the channel list that have not been updated 340, the process continues at step 336. If not 340, the process terminates at step 342.

Figure 4:
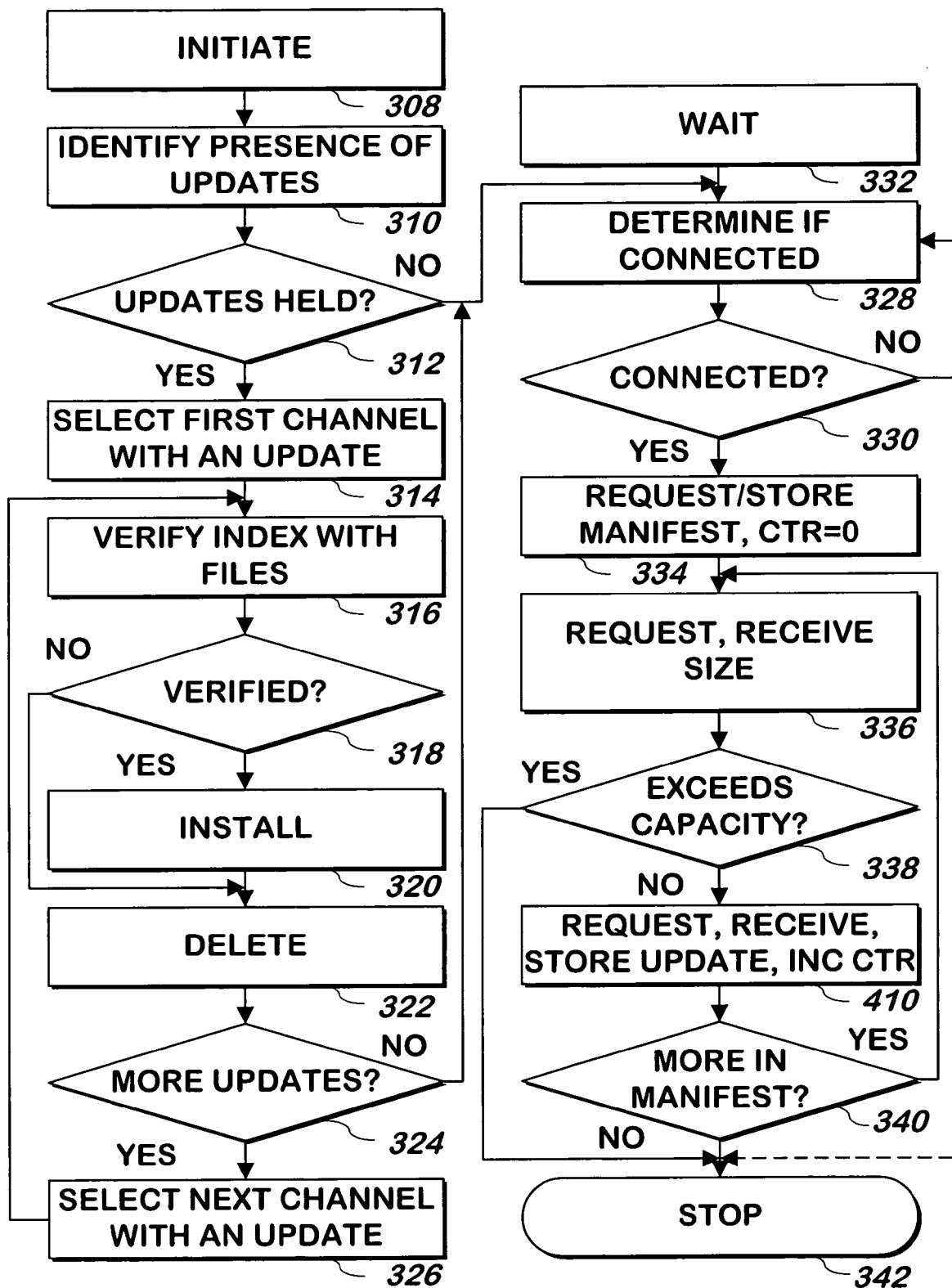
FIG. 4 is a flowchart illustrating a method of updating files or other information in a computer system according to an alternate embodiment of the present invention.

As described above, it is not necessary to attempt to store the channel update and determine if the update will overflow the holding area in steps 336 and 338. Referring now to FIG. 4, a method of updating files is shown according to an alternate embodiment of the present invention. The steps of FIG. 4 are identical to the steps of FIG. 3 except as noted herein. In one embodiment, step 336 identifies the size of the update from the channel index and if the update exceeds the available size 338, the remainder of the update is requested, received and stored 410, and otherwise, the method continues at step 342. In such embodiment, the counter may be incremented in step 410 instead of 336.

What is claimed is:

1. A method of updating a computer system, the method comprising:
    receiving a first set of update information, the first set of update information having a size;
    requesting in a request additional update information responsive to at least the size of the first set of update information;
    updating the computer system responsive to at least the first set of update information received;
    receiving a second set of update information responsive to the request; and
    updating the computer system responsive to at least the second set of update information received;
    wherein a difference in times between a performance of each of the receiving the second set of update information and the updating the computer system responsive to at least the first set of update information is larger than at least one selected from:
        a difference in times between a performance of each of the receiving the first set of update information and the updating the computer system responsive to at least the first set of update information; or
        a difference in times between a performance of each of the receiving the second set of update information and the updating the computer system responsive to at least the second set of update information.

2. The method of claim 1 wherein the updating step comprises deleting at least one set of information, said at least one set of information stored on the computer system prior to the receiving step, responsive to the first set of update information received.

3. The method of claim 1 wherein the requesting step is additionally responsive to a size of an area into which update information may be stored.

4. A method of updating a computer system, the method comprising:
    requesting, on occurrence of a first event, a first set of update information in a first request responsive to a list, the first set of update information being for a first set of information, the list comprising at least one identifier of the first set of information and at least one identifier of a second set of information;
    receiving the first set of update information responsive to the first request;
    updating the first set of information on the computer system by modifying the first set of information responsive to at least the first set of update information received in the first request;
    requesting, on occurrence of a second event following the first event, a second set of update information for the first set of information in a second request; and
    requesting, at least after the occurrence of the first event, a third set of update information for the second set of information in a third request,
    wherein the second request is made before the third request is made,
    wherein a combination of the first set of update information and the third set of update information for the second set of information exceeds a storage size, and
    wherein requesting the third set of update information for the second set of information in the third request is responsive to at least a size of the second set of update information for the first set of information not being larger than the storage size.

5. The method of claim 4, wherein:
    the list has an order; and
    the at least one identifier of the first set of information is ordered prior to the at least one identifier of the second set of information.

6. A computer program product comprising a computer useable medium having computer readable program code embodied therein for updating a computer system, the computer program product comprising:
    computer readable program code devices configured to cause a computer to receive a first set of update information, the first set of update information having a size;
    computer readable program code devices configured to cause a computer to request in a request additional update information responsive to at least the size of the first set of update information;
    computer readable program code devices configured to cause a computer to update the computer system responsive to at least the first set of update information received;
    computer readable program code devices configured to cause a computer to receive a second set of update information responsive to the request; and
    computer readable program code devices configured to cause a computer to update the computer system responsive to at least the second set of update information received;

wherein a difference in times between an operation of each of the computer readable program code devices configured to cause a computer to receive the second set of update information and the computer readable program code devices configured to cause a computer to update the computer system responsive to at least the first set of update information is larger than at least one selected from:
- a difference in times between an operation of each of the computer readable program code devices configured to cause a computer to receive the first set of update information and the computer readable program code devices configured to cause a computer to update the computer system responsive to at least the first set of update information; or
- a difference in times between an operation of each of the computer readable program code devices configured to cause a computer to receive the second set of update information and the computer readable program code devices configured to cause a computer to update the computer system responsive to at least the second set of update information.

7. The computer program product of claim 6 wherein the computer readable program code devices configured to cause a computer to update comprise computer readable program code devices configured to cause a computer to delete at least one set of information, said at least one set of information stored on the computer system prior to the receiving step, responsive to the first set of update information received.

8. The computer program product of claim 6 wherein the computer readable program code devices configured to cause a computer to request are additionally responsive to a size of an area into which update information may be stored.

9. A computer program product comprising a computer useable medium having computer readable program code embodied therein for updating a computer system, the computer program product comprising:
- computer readable program code devices configured to cause a computer to request, on occurrence of a first event, a first set of update information in a first request responsive to a list, the first set of update information being for a first set of information, the list comprising at least one identifier of the first set of information and at least one identifier of a second set of information;
- computer readable program code devices configured to cause a computer to receive the first set of update information responsive to the first request;
- computer readable program code devices configured to cause a computer to update the first set of information on the computer system by modify the first set of information at least responsive to the first set of update information received in the first request;
- computer readable program code devices configured to cause a computer to request, on occurrence of a second event following the first event, a second set of update information in a second request, the second set of update information being for the first set of information; and
- computer readable program code devices configured to cause a computer to request, at least after the occurrence of the first event, a third set of update information for the second set of information in a third request,
- wherein the second request is made before the third request is made
- wherein a combination of the first set of update information and the third set of update information for the second set of information exceeds a storage size, and
- wherein the computer readable program code devices configured to cause a computer to request the third set of update information for the second set of information in the third request is responsive to at least a size of the second set of update information for the first set of information not being larger than the storage size.

10. The computer program product of claim 9, wherein:
the list has an order; and
the at least one identifier of the first set of information is ordered prior to the at least one identifier of the second set of information.

* * * * *